April 17, 1951 R. B. ASPINWALL Re. 23,356

TRANSMISSION CONTROL

Original Filed Jan. 11, 1934 3 Sheets-Sheet 1

INVENTOR.
Robert B. Aspinwall
BY
Swan, Frye & Hardesty
ATTORNEYS

April 17, 1951 R. B. ASPINWALL Re. 23,356

TRANSMISSION CONTROL

Original Filed Jan. 11, 1934 3 Sheets-Sheet 2

INVENTOR.
Robert B. Aspinwall
BY
Swan, Frye & Hardesty
ATTORNEYS

April 17, 1951 R. B. ASPINWALL Re. 23,356

TRANSMISSION CONTROL

Original Filed Jan. 11, 1934 3 Sheets-Sheet 3

INVENTOR.
Robert B. Aspinwall
BY
Swan, Frye & Hardesty
ATTORNEYS

Reissued Apr. 17, 1951

Re. 23,356

UNITED STATES PATENT OFFICE 23,356

TRANSMISSION CONTROL

Robert B. Aspinwall, Detroit, Mich., assignor to The Monopower Corporation, Detroit, Mich., a corporation of Michigan Original No. 2,430,799, dated November 11, 1947, Serial No. 706,232, January 11, 1934. Application for reissue November 4, 1948, Serial No. 58,321

34 Claims. (Cl. 74—336.5)

Matter enclosed in heavy brackets [ ] appears in the original patent but forms no part of this reissue specification; matter printed in italics indicates the additions made by reissue.

The present invention relates to devices of the sort called "transmissions," but more properly designated "torque and speed controls," since they not only transmit power, but vary the torque and speed ratio of a driven shaft with respect to a driving shaft. More particularly the invention is directed to improvement of such devices as used primarily in motor driven vehicles for transmission of power from the motor to the driven wheels thereof.

In the conventional type of device used for this purpose, change of speed and transmitted torque is accomplished by manipulation of movable gears or clutch elements, usually through the use of a hand lever, the load on the gearing being temporarily discontinued while such moving or shifting is accomplished.

This operation, which as stated is commonly performed manually, requires a certain degree of skill, and often is accompanied by clashing and consequent likelihood of injury to gears or clutches, as well as forcing the driver to divide his attention and periodically to remove one hand from the steering wheel. The shifting lever, also, consumes space in the driver's compartment. In order to overcome some of the disadvantages of and objections to this conventional device, various alleged improvements have been devised and such variations as "synchronizing" the gears to permit quiet shifting, coordinating main clutch and shifter, preselection, pedal shifting, have been tried.

There have also been many attempts to provide "automatic" transmission devices, but such devices have met with little success due to various objections.

Among the objects of the present invention is an improved torque and speed control device adapted specifically for automotive vehicles, but which with minor changes can be adapted for use in other machines where the transmission of torque and the speed of operation of the driven portion requires change in accordance with the conditions.

Another object of the invention is a torque and speed control for motor vehicles incorporating improved means for automatically regulating the transmission of torque and speed from the motor to the driven elements in accordance with the requirements of the latter.

Still another object is a device of the class described which may at the will of the operator be operated either entirely automatically, i. e., so as to require no manipulation by the operator to accomplish successive speed changes, or semiautomatically, i. e., so as to require some action by the operator to determine the time at which the speed changes take place, while the selection and actual changes are accomplished by the device itself.

Yet another object is a device of the class described which is comparatively simple in construction and operation, and which on account of its compactness is of substantially the same size as the known conventional devices and in general may be interchangeable therewith.

Still other objects and advantages will readily occur to those skilled in the art upon reference to the following description and the accompanying drawings in which Fig. 1 is a central vertical longitudinal section of the torque and speed control device.

FRAME AND GEARING

Figure 1:
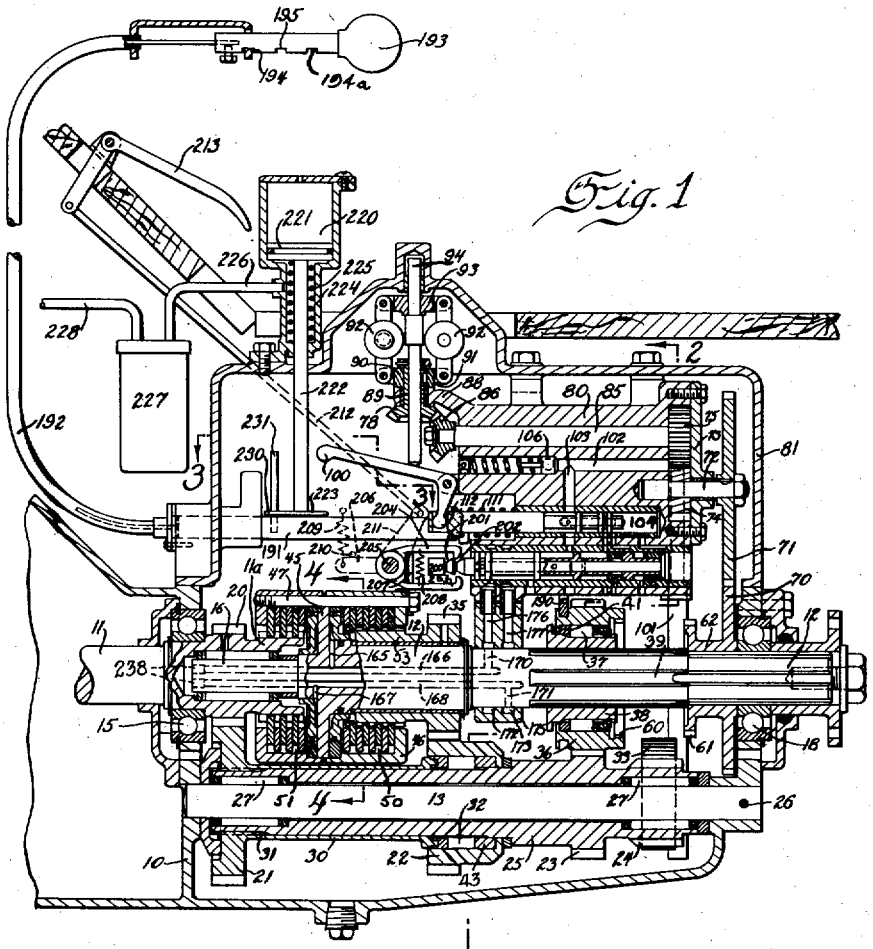
Figure 8:
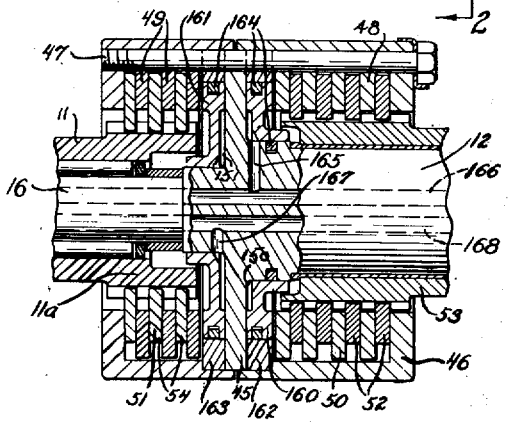
Fig. 8 is an enlarged detailed section of the clutches and clutch operating means.

The housing 10 of the device may, as shown, be more or less conventional in its shape and location in the vehicle, and as is now the usual practice, constitute an extension of the main clutch housing. In this housing *is mounted the main shafting means of the transmission. This main shafting means may comprise, as shown, two substantially coaxial shafts: a drive shaft 11 and a driven shaft 12. A countershaft 13 carries a* [are mounted, in suitable fashion, a drive shaft 11 and a driven shaft 12, and also a countershaft 13 carrying a] gear cluster which will be described in more detail later. The drive shaft 11 extends a short distance into the housing 10 through a suitable bearing 15 and is bored axially to receive the pilot end 16 of the driven shaft 12, the latter entering the housing 10 from the opposite end through a bearing 18 and in alignment with the shaft 11.

Fixed on or integral with the shaft 11 is a gear 20 which is in constant mesh with a gear 21 carried by the countershaft 13. The countershaft also carries gears 22, 23, 24, these being respectively the second speed (intermediate torque) gear, the first speed (high torque) gear, and the reverse gear.

Preferably the gears 21—22—23—24 are mounted on a suitable sleeve 25 which rotates on the shaft 13, the latter fast in the walls of housing 10 and shown held against rotation by a pin 26, while anti-friction bearings 27 for the sleeve are interposed between it and shaft 13.

In the drawing the gear 21 is also indicated as carried by a second or outer sleeve 30, with which it may be integral, as shown. The outer sleeve is keyed, as at 31, upon the sleeve 25. Gear 22, although directly carried by sleeve 25 is coupled thereto only by the overrunning clutch 32 interposed between them for a purpose to be described.

Also mounted in the housing 10 is a reverse idler gear 33 journaled on an independent shaft (not shown) and meshing with the countershaft reverse gear 24, which is fast on sleeve 25, as is also the first speed countershaft gear 23. Loose on the driven shaft 12 is a gear 35 meshing with gear 22 and adapted to be clutched to the shaft 12 to provide the intermediate speed. The clutching means will be described later. Also slidably carried by driven shaft 12 is a gear 36 which may be slid into mesh with either the first speed gear 23 or the reverse idler 33, and is also movable to a neutral position between them in which it meshes with neither. The gear 36 is not keyed directly to shaft 12, but mounted thereon for one directional drive through an overrunning clutch indicated as being of the wedge roller type and incorporated directly in the hub of the gear. The rollers are designated 37. The inner (driven) collar 38 of the overrunning clutch is feathered on the driven shaft 12, and the whole assembly 36—37—38 is slidable on the splines 39 of such shaft. By suitable means (to be described later), the assembly comprising gear 36 and self-contained overrunning clutch is slidable from the position shown in Fig. 1 toward the gear (right) end of the device through an intermediate neutral position into a position in which the gear 36 meshes with the reverse idler 33 to provide for reverse movement of the vehicle.

When the gear 36 is in this position, a lockout clutch prevents overrunning action of rollers 37 by keying gear 36 to the shaft. The lockout clutches includes a fixed clutch element 62 fast on the shaft and a plurality of cooperating clutch teeth 60 carried by the outer race 36 of the overrunning clutch and engageable with the teeth 61 of the element 62 when the slidable gear is in mesh with the reverse idler.

FLUID CLUTCHES, FLUID PUMPING SYSTEM AND GOVERNOR CONTROL

Figure 2:
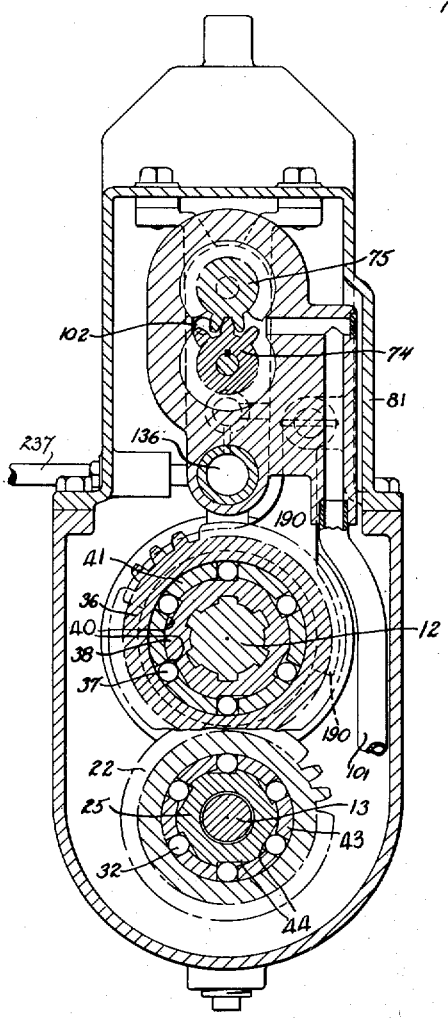
Fig. 2 is a vertical section on line 2—2 of Fig. 1.
Figure 4:
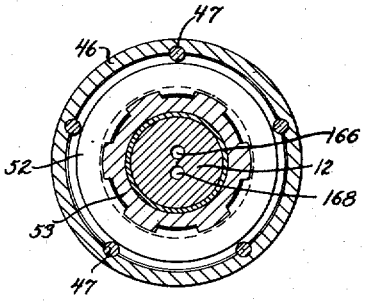
Fig. 4 is a vertical section on the line 4—4 of Fig. 1.

The overrunning clutches through which gears 22, 36 are coupled to the countershaft and to the driven shaft, respectively, are constructed in a manner clearly shown in Fig. 2. They will be seen to be similar, although that carried by the countershaft being fixed thereon, only the overrunning clutch assembly slidably mounted on the driven shaft will be described in detail. The hub portion 38 will be seen to be splined and fitted slidably upon the splined portion 39 of the driven shaft. Angular recesses 40 having bottom surfaces of graduated depth in a common direction, considered circumferentially of the hub, are spacedly formed in the periphery of that member to accommodate rollers 37, which are of such diameter as to project materially from the periphery even when occupying the deeper ends of the recesses. The recesses are spaced sufficiently, as shown, to leave intermediate partly cylindrical portions therebetween, such portions serving to support an element 41 constituting a combined cage for the rollers and bearing bushing for the outer clutch member upon which the gear 36 is cut. Element 41 is slotted to accommodate the rollers 37 which are fitted into the slots, said element being of slightly less thickness than the extent to which the rollers project from the hub when occupying the deepest portions of the recesses. As shown in Figs. 1 and 2, the outer combined clutch and gear element 36 is directly mounted on member 41 and supported both by the portions thereof which project beyond the ends of the rollers and by the partly cylindrical portions intermediate the rollers.

The overrunning clutch similarly mounted in the hub of gear 22 incorporates an analogous combined cage and bushing member 43, while the roller recesses 44 are formed directly in the surface of sleeve 25, as shown in Fig. 2, and the gear, cage and rollers are positioned by shoulder portions of sleeves 25 and 30, as shown in Fig. 1.

The forward end of shaft 12 is provided with a flange 45 which is of relatively large diameter and fixed within and to a divided housing or cage 46, being fastened thereto against relative rotation by means of bolts 47 which extend through the cage and hold the latter together as well as serving as an anchorage means for the plates 48 and 49 of a pair of disc clutches indicated as a whole at 50 and 51. Clutch 50, the other plates of which (52) are splined on the sleeve 53 formed integrally with gear 35, is adapted to fix the latter gear to the shaft 12 to provide the second speed drive condition above mentioned. These plates 48 and 52 are, as mentioned above, splined respectively within the cage 46 and upon the sleeve 53, so that when they are pressed together the sleeve and gear 35 and shaft are locked against relative movement. The cage 46 of course moves as an integral part of the flange 45 formed on the end of the shaft.

The rotatable plates 49 of the clutch 51 are similarly carried by the cage 46, and the intermediates plates 54 splined upon the inner end or hub 11a of the driving shaft 11. Since all the plates are limitedly longitudinally movable, when plates 49—54 are pressed together, a driving connection is established between shafts 11 and 12 through cage 46 and flange 45, providing a "direct drive" (normal engine torque) condition.

Also carried by the lockout clutch sleeve 62, shown as an integral part thereof and arranged near the back wall of the housing 10, is a driving gear 70 for the pump and governor, meshing with another gear 71 located directly above and mounted on the short pump shaft 72. This shaft 72 extends through the wall 73 of a pump housing within which it carries one of the pumping gears (74) of a gear pump, the other gear being shown at 75.

The pump housing may be formed as a casting 80 secured to and within the cover portion 81 of housing 10, and the casting may also be provided with suitable chambers as indicated, which are utilized for purposes presently to be described. Pumping gear 75 is fixed on a shaft 85 extending through the casting 80, and upon its projecting farther end is fixed a bevel gear 86 meshing with another bevel gear 78 having a hub portion 89 journaled in a suitable bracket 88. Keyed to the hub 89 above the bracket is a collar 90 serving as a supporting thrust collar and also carrying ears 91 to which are hinged the lower ends of conventional flyweight governor elements 92. The upper ends of elements 92 are hinged to a second collar 93 mounted on a longitudinally movable governor rod 94 which extends slidably through gear 78 and projects sufficiently below said gear to rest upon a laterally extending arm of the pilot valve controlling lever 100.

Figure 5:
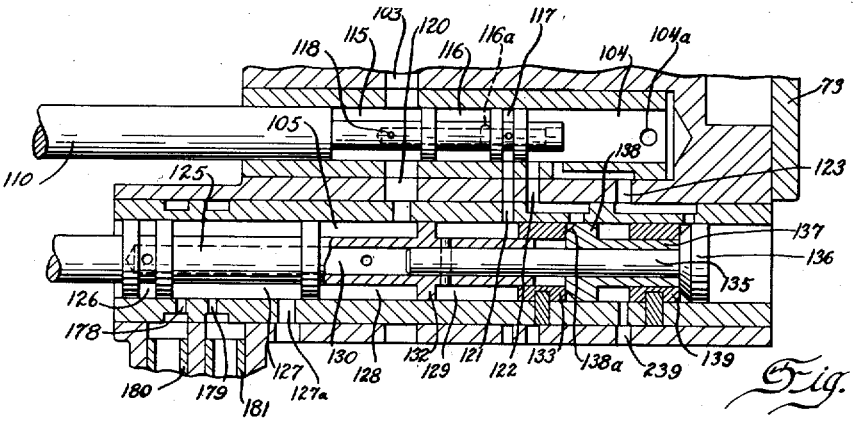
Figs. 5, 6 and 7 are enlarged detailed and somewhat diagrammatic views of the valving mechanism in progressive positions occupied thereby during typical operation of the transmission under advancing vehicle speeds.
Figure 6:
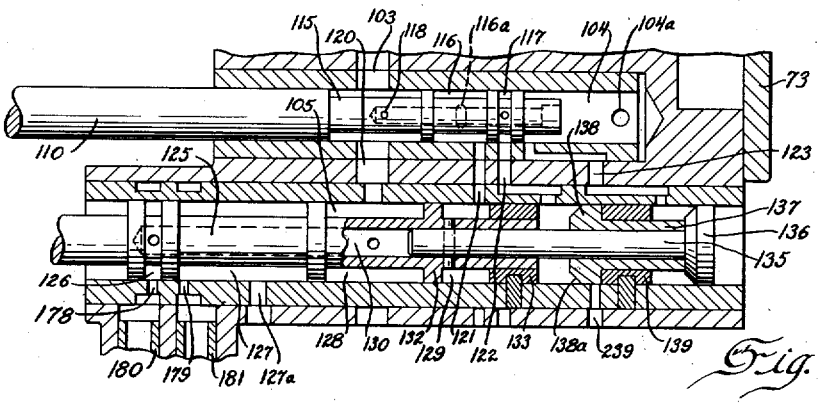
Figure 7:
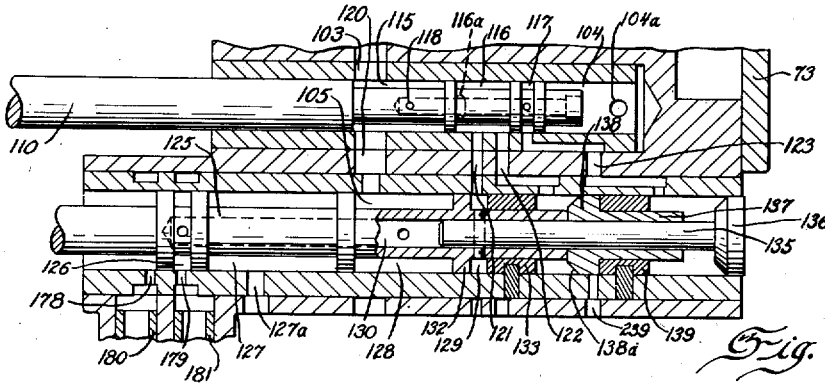

The slidable rod 94 is moved downward by the action of the governor during increasing speeds and vice versa, as will be readily apparent, the elements 92 being thrown outwardly through centrifugal action when the gear 78 is rotated, and upon deceleration urged inwardly by the transmitted action of spring 111 which, in addition to its other functions presently to be described, urges the rod 94 and so the upper, movable section of the governor upwardly. Through the several elements just described, it will be noted movement of the vehicle and consequent rotation of shaft 12 provides a positive inter-related drive of the pump 74—75 and of the governor. Ordinary forward operation of the pump 74—75 results in drawing lubricating fluid from the lower part of housing 10 through the feed pipe 101 and discharge thereof into a small chamber 102, whence it may pass through a conduit 103 to valve chamber 104, and thence to chamber 105 (Figs. 5, 6 and 7). Such discharge is preferably under rather high pressure even under comparatively low speeds of shaft 12, while under higher speeds a predetermined maximum pressure is maintained by providing for escape of excess fluid volume through a spring pressed relief valve 106.

CONTROL VALVES

Operating within chamber 104 is a valve member 110 arranged to be urged in one direction by the spring 111 and movable in the other direction against the tension of the spring by the lever 100. The lever 100 is *actuatable* [actuable], as above noted, by the governor acting through rod 94. This valve member 110 preferably consists of a rod projecting at one end from the casing to receive the spring 111 and slotted at such extremity, as at 112, to cooperate with the lever 100. Near the other end, the rod is turned or otherwise reduced at spaced areas to provide three annular recesses 115, 116 and 117, being also provided with an axial bore as at 118, which bore is connected through suitable openings with recesses 115 and 117 and has its end closed, as shown.

Chamber 104 containing valve member 110 communicates with valve chamber 105, which is formed in the same casting 80, through four ports or passages 120, 121, 122, and 123, passage 120 being the one through which passes the main body of the fluid for clutch operation, and this fluid is directingly controlled in its passage to clutches 50 and 51 by the valve member 125 operating in chamber 105.

Valve member 110, which may be called the "pilot valve," is as mentioned above, movable longitudinally of chamber 104 by the action of the governor spindle 94 and spring 111 in accordance with the rate of rotation of shaft 12, which is a function of the speed of travel of the vehicle. As the speed increases, valve 110 is moved toward the right (Fig. 1) and decrease of speed allows its movement toward the left.

In its several positions, pilot valve 110 controls the movement of the main or control valve 125 in chamber 105. This main valve is also preferably made by turning round stock to provide for several annular recesses 126, 127, 128, and 129, (the latter extending to the end of the valve rod). Of these, those designated 126 and 128 communicate with an inner axial bore 130 constituting a connecting passage between them. Chamber 128 receives the main body of the pressure fluid from valve chamber 104 through passage 120.

Recess 127 is open to the outside through a passage 127a to exhaust back flow of pressure fluid from the clutches 50 and 51. Chamber 129 is expansible and contractible, since the valve carries no wall at its right end (as viewed in the drawings), such end being bounded by a fixed annular wall 133 secured in the chamber 105 of the valve casing, toward and from which fixed wall the movable wall 132 carried by the valve member is movable during actuation of the valve.

The valve member 125 is, as mentioned above, provided with an axial bore 130 produced preferably by drilling the member longitudinally. The end of the bore is closed by a rod 135 which carries on its projecting end a piston 136 spaced from the end of valve member 125 and having slidably mounted thereon a sleeve 137 provided with a shoulder or flange portion 138 movable between stop member 133 and a second fixed stop in member 139 and abuts piston 136, being shorter than the distance between piston 136 and the end of valve member 125.

With the pilot and valve construction just described, it will be noted that all pressures of the working fluids used for clutch control are balanced in the several chambers, and that consequently there is in no instance an unbalanced pressure to cause excessive friction to interfere with free valve movement. For example, in chamber 115 the pressure is radial and equal in all directions between the cylindrical outer wall of the chamber and axially located reduced portions of valve member 110, while longitudinal pressure bears equally against the opposed integral annular partitions on the valve member itself, these being of equal area. The other annular chambers, with the exceptions below noted as to the actuating chambers for valve 125, are all under similar conditions.

VALVE OPERATION

In the operation of the valves just described, control valve 125 assumes three positions, which may be designated as positions "A," "B" and "C." These three positions are shown, in the order named, in Figs. 5, 6 and 7. Position "A," shown in both Figs. 1 and 5, is the low or first speed position. In position "B" shown in Fig. 6, clutch 50 is held in engagement. This constitutes the intermediate or second speed position. Position "C," shown in Fig. 7, is one in which clutch 51 is held in engagement, and is the third speed or direct drive position.

Before describing the operation of the valves, the connections to and actuating means for the clutches should be understood. As stated above, the clutches 50 and 51 each comprises plates (48—49) splined to the inner surface of cage 45, and intermediate plates (52—54) splined to gear sleeve 53 and to extension 11a of shaft 11, respectively. To engage the clutches the cooperating plates are pressed together, by a piston 160 in the instance of clutch 50, and by another piston 161 in the case of clutch 51. Both pistons utilize flange 45 as a reaction wall for the operating pressure fluid. As indicated, the pistons 160 and 161 are annular and slide in annular chambers or cylinders formed by rings 162 and 163, respectively, carried adjacent opposite sides of the outer edge of flange 45 and if desired fitted within the cage assembly, as shown, to form the fluid tight cylinders 150—151 respectively which in turn communicate individually with longitudinal fluid channels 166—168 which extend through the driven shaft and pilot portions 12—16. Suitable packing rings 164 may be provided to seal the pistons 160—161 with respect to the cylinders.

In the "A" position shown in Figs. 1 and 5 neither of the clutch operating means just described for clutches 50 and 51 is being operated, and these clutches are accordingly disengaged. The vehicle drive is consequently through shaft 11, gears 20 and 21, sleeve 25, gears 23—36, clutch 37, and shaft 12. As the speed of rotation of shaft 12 increases, however, the governor is rotated (through gears 70, 71, 74, 75, shaft 85 and bevel gears 86—87) while at the same time the pump gears 74—75 force fluid into chamber 102.

Before the governor has reached sufficient speed to move valve 110 to the second speed position, fluid under pressure is being forced into chamber 115, through passage 120 to chamber 128, and hence through passage 130 to outlet recess 126, whence, however, it has no escape. At the same time, fluid is passing through bore 118, recess 117 and passage 121 to chamber 129, where it acts to maintain valve 125 in the position shown, the valve having been previously so positioned by sufficient slowing down of the vehicle.

When the governor speed is increased, valve 110 (normally) moves to the right, and recess 117 registers with passage 122. When this condition obtains, fluid is forced through passage 122 into the space between the sleeve flange 138 and annular wall 133, the presence of some space between them accessible to fluid entering through passage 122 being insured by the beveled edge 138a of the flange, which forms a small annular chamber into which the fluid may flow. This forcing of fluid under pressure thereinto causes sleeve 137 to move to the right until the flange 138 strikes the annular stop wall 139, and as the sleeve 137 abuts piston 136, the valve 125 is carried along this far, i. e., to the "B" position shown in Fig. 6. It cannot coast farther because of back pressure against the end of valve 125, and accordingly comes to rest with recess 126 in registry with port 178, as shown, and the fluid passing therethrough flows to and causes actuation of clutch 50 to engage the same and fix sleeve 53 and gear 35 to shaft 12, flowing to the clutch through passages 176, 170, 166, 165. This coupling of gear 35 to the driven shaft renders the second or intermediate speed drive effective through gears 20, 21, 22 and 35. As the low speed gears 36—23 are still in mesh, the overrunning clutch 37 comes into action, since the intermediate speed gearing turns the driven shaft more rapidly.

When vehicle speed is still further increased, the governor (normally) moves the valve 110 farther inward until valve chamber 117 registers with port 123. This permits passage of fluid into the space between wall 139 and piston 136. The latter is thereby forced further to the right, pulling the main valve member 125 in the same direction until its right end strikes the flanged end 138 of sleeve 137, thereby stopping valve 125 in position "C" (Fig. 7) and registering chamber 126 with port 179. In this position clutch 50 is released, being connected to the atmosphere through the uncovering of port 178 which places this port in communication with the open left end of the valve chamber 105. Fluid under pressure then passes through port 179 and into the passages leading to clutch 51, which is thus operated to fix the inner end of shaft 11 to cage 46 and so the flange 45 on shaft 12, thereby coupling such shafts to establish direct drive. During both movements of the main valve to the right, that is, from position "A" to position "B" and from position "B" to position "C" fluid from chamber 129 may exhaust through port 116a, to which the chamber will be seen to connect by passage 121 and recess 116. During movement of sleeve 137 to the right, which occurs as the valve shifts from the "A" to the "B" position, fluid in the decreasing area between flange 138 and end wall 139 may exhaust through port 239.

Upon a decrease of vehicle and accordingly of governor speed, reverse valve actions occur. When in its movement to the left pilot valve 110 reassumes its central position shown in Fig. 6, fluid under pressure is again admitted to the space between sleeve flange 138 and wall 133 to move the main valve to the left as far as the "B" position shown in Fig. 6. Such actuation is induced by the pressure against the right hand end of valve 125, but when the piston head 136 strikes the end of sleeve 137, movement of the valve to the left is arrested, and it is then positively held in this position by the pressure against sleeve head 138, which pressure is of course greater than that acting against the reduced end of the valve to the left and so holding it firmly located in the desired position. During such movement of the main valve to the left, from the "C" to the "B" position, fluid between piston head 136 and end wall 139 exhausts through port 104a, while the connection simultaneously effected between main outlet port 179 and chamber 127 permits fluid from motor cylinder 151 of direct drive clutch 51, and its supply system, to exhaust through port 127a. During this movement, also, presence of the port 116a prevents undue reduction of pressure in chamber 129, as will be readily apparent, since port 116a opens to the interior of the casing. While in this (B) position the intermediate speed drive is maintained by engagement of clutch 50 in the manner above described, the motor cylinder of which is fed through port 178.

If deceleration continues and the pilot valve moves still further to the left, chamber 117 is connected to chamber 129 of the main valve, through port 121, and the pressure introduced into the latter chamber and acting against wall 132 moves the valve 125 still farther to the left, until as shown in Fig. 5, the main outlet chamber 126 is closed, the opposing pressure against sleeve head 138 being then relieved because feeding recess 117 no longer registers with its connecting passage 122. The last mentioned passage is also thereby connected to atmosphere through port 104a to allow escape of fluid from the chamber between head 138 and wall 133, while the simultaneous connection of port 178 to chamber 127 and so to outlet 127a allows escape of fluid from motor cylinder 150 of clutch 50, which being deenergized leaves only the low speed drive effective, as will be readily apparent. Port 239, also opening to the interior of the casing, forms a breather for the area between wall 139 and sleeve head 138 as the latter moves to the left during this movement from "B" to "A" position and vice versa.

REVERSE GEAR

Reverse drive operation, as mentioned above, is accomplished by moving the gear-clutch assembly 36—37—38 to the right (as viewed in the drawings) until gear 36 meshes with the idler gear 33 and the teeth of lockout clutch members 60 and 61 engage. This movement may be effected by a shifter fork 190 carried by a slidable rod or bar 191 operable in any convenient fashion, as by the Bowden wire unit 192 actuable by the connected handle member 193. Handle member 193 is preferably provided with two notches 194—194a which fix the "forward" and "reverse" positions respectively, and a middle notch 195 which determines an intermediate "neutral" position. The latter notch is so disposed that when the handle member is hooked therein, gear 36 lies between gears 23—33, and out of mesh.

TORQUE DEMAND CONTROL

Figure 3:
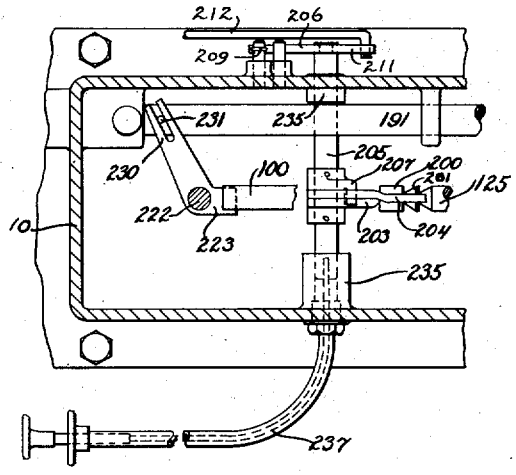
Fig. 3 is a horizontal section on the line 3—3 of Fig. 1.

The speed at which the driven shaft is rotating, however, is not in itself the optimum determinant of the proper time of shifting. Where the transmission is used in a motor vehicle, particularly, the power or driving torque which the operator demands of the engine is also important. As variations of the torque demand upon an internal combustion engine are accompanied by proportional variations of suction effect, or pressure reduction, in the intake manifold (the vacuum dropping off as the throttle is opened wider with relation to the speed at which the engine is running), advantage is taken of this fact to further govern the gearing ratio. For this purpose there is mounted in the cover portion 81 of the device a small cylinder 220 containing a piston 221 having a long stem or rod 222 extending to a point below lever 100, where it carries a plate 223. Cylinder 220 has at its lower end an axial extension 224, serving to house a spring 225 which tends to urge piston 221 upwardly, and also serving as a suction chamber below the piston. Chamber 224 is connected through tube 226 to a small reservoir or closed chamber 227, which in turn is connected through tube 228 to the intake manifold (not shown) of the engine. The plate 223 is provided with a forked extremity 230 which so cooperates with a pin 231 carried by the shifter rod 191 that when the rod 191 is shifted to move gear 36 to neutral or reverse position in the manner above described, the arm 223 is swung out of the path of lever 100 (Figs. 1 and 3). During forward operation of the vehicle, however, arm 223 is movable in the path of movement of the lever if piston 221 moves, but spring 225 is not sufficiently strong to overcome the normal suction effect of the engine when running, which tends to draw the piston down and hold it there during normal operation of the vehicle, so that arm 223, being held down in the position indicated in full lines in Fig. 1, does not interfere with free movement of the lever 100 under the influence of the governor, which accordingly then controls gear changes in direct response to driven shaft speed in the manner above described and as if the arm 223 and connected suction mechanism were not present. If, however, the normal suction in the intake manifold is unduly decreased, as by opening the throttle wider while the engine, because of the load upon it, is unable to accelerate proportionately, the decrease of suction is communicated to suction chamber 224, and the spring overcomes the decreased suction and allows piston 221 to rise, connecting rod 222 draws upwardly upon arm 223 and the latter blocks, lifts or opposes downward movement of lever 100, in accordance with the relative downward pressure being exerted thereon by the governor. Such action of course holds valve 110 in or causes it to assume a lower speed position, with results which will be readily understood from foregoing portions of the description. Lifting of the lever 100 will actually occur under such a power demand indicated by disproportionate throttle opening unless the governor speed is sufficient to prevent. It is of course necessary to coordinate the tension of spring 225 and the governor so that open throttle operation of the engine cannot overcome the governor action at moderately high and higher speeds. The accumulator chamber 227 arranged in the suction line to the manifold acts as a delaying agency by preventing actuation of the piston 221 under the influence of unduly short or virtually instantaneous reversals of pressure such as are caused by erratic or momentary operation of the throttle. The size of the tubing or of the opening or openings communicating with the chamber, and its capacity, are of course so proportioned that a desirable interval is consumed in building up or reducing the pressure therein before the change of pressure is effective to cause operation of the piston.

SEMI-AUTOMATIC CONTROL

The functioning of the mechanism already described renders the device fully automatic, for the movements of main valve 125 induced by the pilot valve 110 controlled by the governor and suction mechanism just described effect engagement and release of clutches 50—51 in direct response to the speed of the driven shaft and the torque demand upon the engine. The governor and associated parts are not only proportioned in their effect upon pilot valve lever 100, to the force with which the spring 225 and other portions of the suction mechanism tend to actuate that lever, but may be regulated to provide for changing ratios at any desired vehicle speeds. For example, the mechanism may be set so that the second speed clutch engages at say five miles per hour, and the third speed or "direct" drive clutch at fifteen miles per hour under normal shifting uninterfered with by the suction mechanism blocking arm 223, but whatever the shifting speeds, the driver has no definite control over the change.

If it is desired to make the device "semi-automatic," i. e., allow the driver to determine the time of change, use may be made of the pedal escapement mechanism shown. This mechanism includes an extension 220 carried by valve 125 and provided with two notches 201 and 202 adapted to cooperate with an escapement device comprising a pair of hooked arms 203 and 204 individually swingable upon their supporting shaft 205 and one slightly longer than the other. The shaft 205 also carries an escapement actuating part 207 projecting between the arms and fast upon the shaft, while the escapement arms, which are of course loose on the shaft, are drawn toward each other and against part 207 by a spring 208. A bellcrank, the arms of which are designated 206—211 is fixed to the end of shaft 205 which projects from the housing (see Fig. 3) and to arm 206 is secured a spring 209 urging it against a stop 210 and thereby yieldably holding the escapement device in centered position. When so centered the escapement arms are spaced insufficiently to allow the extension portions 200, 201, 202 of the valve rod to pass between them.

To the other arm 211 of the bellcrank is attached a link 212 connected at its other end to a foot pedal 213 which may be the throttle or accelerator pedal for the engine, although it is of course obvious that a separate pedal may be used if desired. Assuming the car to be under way, and the fluid pressure acting under the controlling means previously described tending to urge the main valve to the right to increase the gearing ratio, as the vehicle speed increases, the action is as follows:

When the pedal 213 is depressed, which normally opens the engine throttle, arm 204 is withdrawn from notch 202, but at the same time arm 203 hooks into this notch, being slightly longer than arm 204. If pedal 213 is the throttle control, its depression and opening of the throttle tends to increase the vehicle speed, and when such speed increase occurs, while valve 125 is held against movement, the pilot valve 110 is moved over by the governor to the position in which the chamber 117 registers with port 122, and the fluid pressure accordingly attempts to move valve 125 to its "B" or second speed position, as will be understood. Such controlling movement of the pilot valve may, as stated, be adjusted to take place at any suitable or desired vehicle speed, as for example 5 M. P. H. When the vehicle has attained a speed (above 5 M. P. H. in our assumed adjustment) at which the operator desires to change to the intermediate gear, he merely releases the pedal 213. Arm 203 immediately releases notch 202 while arm 204 engages notch 201 as the main valve moves over to its "B" position. When the pedal 213 is again depressed, arm 203 catches the shoulder 201 as arm 204 releases it, and holds the valve in the "B" position, as long as the accelerator pedal is depressed. As the speed of the vehicle continues to mount, and when it passes a predetermined point, illustratively fixed at 15 M. P. H., the pilot valve is moved still farther to the right until chamber 117 is connected to port 123 and the fluid pressure accordingly tends to force the control valve toward the "C" position, as explained above. It of course cannot move to such position while the escapement maintains its engagement with shoulder 201, but when the operator now again releases the pedal, the valve is released and moves to the "C" position, whereupon clutch 51 is engaged to establish direct drive, which will be maintained until the speed drops to the predetermined point, whereupon reverse operation takes place. It will be seen, however, that upon deceleration the escapement mechanism cannot delay shifting back to the lower gear ratios as the escapement is not effective in this direction, both the backs of the hooks 203—204 and the abutments being inclined to permit the hooks to ride freely over the latter. Even though the pilot valve may move directly and uninterruptedly to the extreme right hand position, it will be noted that the escapement mechanism prevents any danger of sliding past second gear by holding the main valve in "B" position for a desired interval insures proper successive operation of all gears.

To provide means whereby the escapement may be rendered ineffective and the shifting made automatic, the escapement shaft 205 may be slidably mounted in its supporting bearings 235 in the housing walls (Fig. 3), thereby permitting bodily movement of the escapement mechanism out of alignment with the cooperating extremity 200 of the valve body 125. Sliding of the shaft may be effected by the operator from the driver's seat through the agency of a Bowden wire 237 connected to the shaft and running to a desired point in the driver's compartment or elsewhere. It will be seen that when the escapement is rendered inoperative by moving the arms 203—204 clear of the notched valve extremity, the valve movements are free to occur in response to the mechanical and suction governor controls, without lag, and the shifting is accordingly fully automatic.

MISCELLANEOUS DETAILS

Several features of the present construction which have very positive beneficial results should be noted. For example, the valve construction provides for balanced pressures in all directions and thereby prevents undue resistance to movement. The use of a non-pulsating constant delivery pump such as that shown is highly desirable if not essential to the efficient operation of the device. By connection of both the pump and governor to the driven shaft, also, certain operations are provided for which would not otherwise be possible with a device of this kind. For example, if it is desired to start the engine by towing the vehicle, it is necessary only to put the device in "neutral" position and the engine will then be turned over through the action of clutch 51 when the speed has been brought up to the point where the valve 110 is in the third or high speed position. In this neutral position the suction torque control is disconnected and inoperative by reason of movement of arm 223 out of the path of lever 100 in the manner above described. This provision is made because otherwise with the engine not running the spring 225 acting against the lever 100 would restrain movement of same and hence engagement of the clutch. If the device is not provided with the suction torque control, the engine may of course be turned over without shifting transmission into "neutral."

If it is desired to tow the vehicle without turning the engine, this may be accomplished by leaving the shifter in forward position, as the suction torque control will then be in its upper position, and thereby retain valve 110 in the low speed position, and the clutch upon which the low speed gear is mounted will then overrun. Of course, in such case, the towing speed should not be high enough for the governor to overcome the tension of spring 225. Where, however, the device is not provided with a suction torque control, means may be provided to "bypass" the pressure fluid. Such means may consist of a conventional two-way valve across chamber 102 or other suitable means.

By virtue of the fact that the pump drive is from the driven shaft, reverse operation of the vehicle, in causing reverse rotation of the driven shaft, reverses the action of the pump, which thereby delivers no fluid to the several valve chambers. This action provides a positive means of preventing actuation of either of the clutches 50 and 51 during reverse operation of the vehicle at any speed of travel. No matter what position valve 110 may assume under reverse operation of the governor no fluid pressure will be delivered to valve 125 to tend to move the clutches.

It will be seen that the several elements of the transmission are so arranged within the casing that not only may the lower and upper or cover sections of the casing be separated without disassembling any of the internal structure, but that both flexible connections are attached to parts carried by the cover section, and that no other mechanical connections need be made to the unit except through the shafts themselves, as a result of which its carriage by a cushioned or other movable support, as is the case when it is attached to a resiliently mounted engine, occasions no difficulty in its control.

In forming the fluid conducting passages 166—168 in the driven shaft 12 the bores forming their longitudinal portions are preferably drilled in the shaft through the pilot section 16 from that end, and the extremities of the bores plugged, as at 238. This eliminates weakening that end of the shaft carrying the low speed (high torque) gears, as well as providing the shortest possible channels.

The incorporation of the overrunning clutch in the second speed countershaft gear is also highly advantageous, inasmuch as it greatly reduces friction on the plates of clutch 50 by preventing rotation of the driving plates 52 affixed to gear 35 when the drive is not through the second speed train. This feature also permits opening of valve ports 178—179 in very quick succession or actually overlapping relation without injury to clutches or other parts, since the overrunning clutch under consideration can function to prevent such injury if the high speed drive is taken up before the second speed clutch is disengaged.

While it will be apparent that the illustrated embodiments of my invention therein disclosed are well calculated to adequately fulfill the objects and advantages primarily stated, it is to be understood that the invention is susceptible to variation, modification and change within the spirit and scope of the subjoined claims.

I claim:

1. In combination with a gear transmission incorporating driving and driven shafts and a plurality of fluid-operable members movable to change the effective driving ratio between said shafts, means for moving said members, comprising a fluid pump drivable by said driven shaft, a pilot valve *having a plurality of outlets* connected to the output of the pump to divert a portion of the output thereof in diverse directions, another valve [actuable] *having a plurality of outlets actuatable* in different directions, by fluid diverted by the first valve and arranged to direct output from the pump through selected outlets, said fluid-operable members being connected to different ones of said outlets of the second mentioned valve and being individually operable in response to delivery of fluid thereto when said valve is moved to different positions, means for controlling the movement of the first mentioned valve and operable in response to the working of the transmission, and means for controlling the operation of the second valve.

2. In combination with a gear transmission incorporating driving and driven shafts and a plurality of fluid-operable elements movable to vary the driving speed ratio between driving and driven shafts, means for moving said elements comprising in combination with a source of fluid, a fluid pump drivable by the driven shaft, a pilot valve connected to the output of the fluid pump and having a plurality of outlets through which a portion of the output of the pump may be selectively directed by movement of the valve, speed responsive means also drivable by said driven shaft and connected to the pilot valve for shifting the same responsively to variances of speed of the driven shaft, additional valving means having a plurality of outlets connected to different ones of said fluid-operable elements, and means connecting the pilot valve outlets to be second mentioned valving means to controllingly actuate the latter.

3. In a change speed gear transmission, a casing, a driving shaft extending thereinto, a driven shaft also extending into the casing and substantially coaxial with the driving shaft, a countershaft, gears carried by the said shafts, means for selectively coupling and uncoupling certain of said gears and shafts to change the driving ratio of the transmission, including a fixed clutch member carried by and spaced from the end of the driven shaft, a slidable clutch member also carried by the driven shaft between said fixed clutch member and the driving shaft, gearing connecting said slidable clutch member and the countershaft, manually controllable means for moving said slidable clutch member into and out of engagement with the fixed clutch member, and automatic actuating means for operating other portions of said coupling and uncoupling means including *hydraulic means for operating said other portions and* governor means responsive to speed variances of the driven shaft *for controlling said hydraulic means*, said clutch members being positively engageable, and said other portions of the coupling and uncoupling means including a friction clutch.

4. In a change speed gear transmission incorporating driving and driven shafts and fluid-[actuable] *actuatable* elements movable to change the effective ratio of transmitted torque and speed, in combination with a source of fluid under pressure, a pilot valve *having a plurality of outlets* movable to direct pressure fluid to different channels, governor means drivable by [one of] said *driven* shaft[s] and connected to the pilot valve for automatically controlling movement thereof, a control valve having portions connected to the several outlets of the pilot valve whereby its actuation is controllable by movement of the latter, said control valve also having portions terminating in a plurality of outlets connected to said fluid-[actuable] *actuatable* elements for selectively directing the main portion of the fluid pressure flow to different ones of said elements, whereby upon shifting the pilot valve the control valve may be moved to different positions to actuate different ones of said fluid-[actuable] *actuatable* elements, and personally operable means for preventing such normal movement of the control valve.

[5. In a change speed gear transmission incorporating driving and driven shafts and a plurality of gear trains potentially connecting said shafts for driving the driven shaft at any of a plurality of forward relative speeds or in a reverse direction, means including a plurality of movable members for rendering any one of said gear trains effective to drive the driven shaft to the exclusion of the rest, power means for actuating certain of said movable elements, personally operable means for actuating at least one of said elements into operative position for reverse driving of the driven shaft or to a neutral position, automatic means for controlling application of the power means to the movable elements drivable thereby, escapement means responsive to movement of the personally operable means to neutral position for preventing effective operation of the automatic means, and manually operable means for disconnecting the escapement means.]

[6. In a change speed gear transmission device, substantially coaxial driving and driven shafts, a countershaft parallel to both, a plurality of gear trains carried partly by the countershaft and partly by the driving and driven shafts for connecting said driving and driven shafts through trains of different ratios, including an intermediate speed gear carried by the counter shaft and connected thereto through an overrunning clutch, a gear on the driven shaft meshing with said gear, friction clutch means for rendering the train containing said two last mentioned gears effective and ineffective another gear carried by the countershaft, a gear carried by the driven shaft and connected thereto through an overrunning clutch and meshing with said last mentioned gear carried by the countershaft to provide a high torque drive, positively engageable and disengageable means for rendering said two last mentioned gears effective and ineffective, said gears and last mentioned means providing a driving connection independent of the previously mentioned gearing and friction clutch means, and additional friction clutch means providing driving connection between the driving shaft and countershaft, and means connecting the driving shaft and countershaft.]

7. In a change speed gear transmission, substantially coaxial driving and driven shafts having abutting end portions, a countershaft parallel to both said shafts, means connecting the driving and countershafts, clutching means for directly coupling the driving and driven shafts, an intermediate speed gear carried by the countershaft and connected thereto through an over-running clutch, a gear loose on the driven shaft meshing with said last mentioned gear, clutching means for securing said loose gear to the driven shaft, another reduced speed gear fast on the countershaft, and a gear meshing with said last mentioned gear carried by the countershaft and mounted on and connected to the driven shaft through an overrunning clutch.

8. In a change speed gear transmission, substantially coaxial driving and driven shafts having abutting end portions, a countershaft substantially parallel to both said shafts, gearing means connecting the driving and countershafts, a plurality of reduced speed gears carried by the countershaft, one being fast thereon and another connected thereto through an overrunning clutch, a plurality of gears on the driven shaft meshing with said reduced speed gears carried by the countershaft, fluid-[actuable] *actuatable* clutching means for coupling to the driven shaft the gear carried thereby and which meshes with the countershaft gear which is driven through the overrunning clutch, additional fluid-[actuable] *actuatable* clutching means for directly coupling the driving and driven shafts, a reverse idler drivable by the driven shaft, an overrunning clutch assembly slidably keyed to the driven shaft, a reduced speed gear forming part of said assembly and drivable by and slidable with the overrunning clutch and adapted [to mesh with neither gear when in one position], to mesh with the gear fast on the countershaft when the assembly is in [another] *one* position, and to mesh with the reverse idler when the assembly is slid to another position, *and to mesh with neither gear when moved to a third position,* means for locking out the overrunning clutch when said assembly is in the last mentioned position, fluid pressure means for individually actuating said fluid-[actuable] *actuatable* clutching means, automatic governor means for controlling the operation of said fluid power means, and personally operable means for sliding said assembly.

9. In combination with an internal combustion engine and a throttle lever for controlling operation thereof, a change speed gear transmission for an automobile for transmitting power from the engine, comprising a frame, driving and driven shafts rotatable in the frame, a plurality of gear trains potentially connecting said driving and driven shafts through gearing of different ratios, means for selectively connecting and disconnecting certain of said gears and shafts to render desired ones of said trains effective or ineffective, actuating means for operating said connecting and disconnecting means, a movable control member for directing the application of said actuating means to the operation of the connecting and disconnecting means, governing means responsive to speed variances of the driven shaft for regulating movement of the control member, means including a fluid pump for yieldably urging the control member toward different positions in accordance with such speed changes induced by the governing means.

10. In combination with an internal combustion engine and a throttle lever for controlling operation thereof, a change speed gear transmission for transmitting power from the engine comprising a frame, driving and driven shafts rotatable in the frame, a plurality of gear trains potentially connecting said driving and driven shafts through gearing of different ratios, means for selectively connecting and disconnecting certain of said gears and shafts to render desired ones of said trains effective and ineffective, actuating means for operating said connecting and disconnecting means, a movable control member for directing the application of said actuating means to the operation of the connecting and disconnecting means, a second control member for controlling the operation of the first mentioned control member, governing means responsive to speed variances of the driven shaft for regulating movement of the second control member, means including a fluid pump for yieldably urging the first mentioned control member toward different positions in accordance with changes of position of the second control member induced by the governing means.

11. In a speed and torque change transmission, a housing comprising a body and cover, a driving shaft and a driven shaft rotatably mounted in said body of the housing, a plurality of clutches mounted on one of said shafts and operable by fluid pressure, means mounted within said cover of the housing for supplying fluid under pressure for operating said clutches, a manifold surrounding said shaft upon which the clutches are mounted for conducting fluid to the clutches, and disjointable conduit connections between said cover and body portions to connect the manifold and said fluid pressure supply means.

12. In a speed and torque change transmission, a housing, a driving shaft, a driven shaft, a plurality of clutches operable by fluid pressure and mounted on the driven shaft, an intermediate gear and a low gear both also mounted on the driven shaft, and a fluid source, a fluid pressure pump, a speed-responsive device, valving means actuated thereby for selectively directing fluid pressure to the various clutches, and means connecting both the pump and the speed responsive device to the driven shaft.

13. In a speed and torque change transmission, a housing, a driving shaft, a driven shaft, a plurality of clutches operable by fluid pressure and mounted on the driven shaft, an intermediate gear and a low gear both also mounted on the driven shaft, and a fluid source, a fluid pressure pump, a speed-responsive device, valving means actuated thereby for selectively directing fluid pressure to the various clutches, and common means connecting both the pump and the speed responsive device to the driven shaft.

14. In a speed and torque change transmission, a housing, a driving shaft, a driven shaft, bearings located substantially at the ends of the housing for carrying said shafts, a plurality of clutches operable by fluid pressure and mounted on the driven shaft, an intermediate gear and a low gear both also mounted on the driven shaft, and a fluid source, a fluid pressure pump, a speed-responsive device, valving means actuated thereby for selectively directing fluid pressure to the various clutches, and common means connecting both the pump and the speed responsive device to the driven shaft located between said low gear and the driven shaft bearing.

[15. In a change speed gear transmission, a drive shaft, a driven shaft, clutches thereon actuable by fluid pressure, an intermediate and a low gear also mounted on the driven shaft, a fluid pressure supply source for actuating said clutches and a fluid conduit manifold adapted to conduct fluid to said clutches and surrounding said driven shaft between said intermediate and low gears.]

16. In combination, a fluid source, a fluid pressure pump, variable speed driving means for the pump, a main valve connected to said pump and having a plurality of outlets adapted to be opened selectively by moving the valve to varying positions, said main valve having a plurality of piston portions for actuating the same, a pilot valve for directing fluid pressure selectively against the several pistons of the main valve, and a speed sensitive device actuated by the pump driving means to control actuation of the pilot valve.

17. In a change speed gear transmission, a driving shaft, a driven shaft, a plurality of gear trains for connecting said shafts in variant relative driving speed relation, means *including hydraulically actuated friction clutches* for selectively rendering said trains effective or ineffective at will, governor means *including a centrifugally actuated means* responsive to the speed of the driven shaft for automatically controlling said *hydraulically actuated friction clutches* [last mentioned means], means movable to establish neutral and reverse drive positions, and means responsive to such establishment of *one of said* [neutral or reverse] drive positions for rendering said governor means ineffective.

18. In a change speed gear transmission, a driving shaft, a driven shaft, a plurality of gear trains for connecting said shafts in variant relative driving speed relation and including an element shiftable to establish a low speed drive and also shiftable to a neutral position, personally operable means for shifting said element, means *including hydraulically actuated friction clutches* for selectively rendering said trains effective or ineffective at will, governor means *including a centrifugally actuated means* responsive to the speed of the driven shaft for automatically controlling said *hydraulically actuated friction clutches* [last named means], and means for rendering said governor means ineffective when said shiftable element is in one position.

19. In a change speed gear transmission, a driving shaft, a driven shaft, a plurality of gear trains for connecting said shafts in variant relative driving speed relation and including an element shiftable to establish a low speed drive and also shiftable to a neutral position, personally operable means for shifting said element, means *including hydralically actuated friction clutches* for selectively rendering said trains effective or ineffective at will, governor means *including a centrifugally actuated means* responsive to the speed of the driven shaft for automatically controlling said *hydraulically actuated friction clutches* [last named means], and means for rendering said governor means ineffective when said shiftable element is in low speed position.

[20. A torque changing device having a driving shaft, a driven shaft and a countershaft, selectively engageable elements providing a plurality of torque transmitting connections between said driving and driven shafts through said countershaft at different ratios, said torque transmitting connections including a gear carried by the countershaft, and overrunning clutch mounted in the hub of said gear, a gear carried by the driven shaft and constituting an element of another gear train, and another overrunning clutch mounted in the hub of said last mentioned gear.]

21. A torque changing device including a driving shaft, a driven shaft and a countershaft, selectively engageable elements providing a plurality of torque transmitting connections between said driving and driven shafts through said countershaft at different ratios, said torque transmitting connections including a gear on the countershaft, an overrunning clutch mounted in the hub of said gear, another gear carried by the driven shaft and adapted to mesh with said first mentioned gear, another gear carried by and slidable along the driven shaft, an overrunning clutch mounted in the hub of said last mentioned gear, and a gear fast on the countershaft and meshing with said slidable gear.

[22. A torque converting device including a driving shaft, a driven shaft, and a countershaft, a low speed gear train including a gear carried by the countershaft, a larger gear meshing therewith carried by the driven shaft, an overrunning clutch connecting the last mentioned gear and the driven shaft, another gear train including another gear carried by the countershaft, an overrunning clutch connecting said gear to the countershaft, and a smaller gear carried by the driven shaft and meshing with said last mentioned gear.]

23. A torque converting transmission including a driving shaft, a driven shaft and a countershaft, a plurality of gear trains connecting the driving and driven shafts through the countershaft, including a gear on the countershaft meshing with a larger gear carried by the driven shaft [,] and another gear carried by the driven shaft and meshing with a larger gear carried by the countershaft, and overrunning clutch means coupling each of said larger gears to its supporting shaft for one directional drive.

[24. A torque converting transmission including a driving shaft, a driven shaft and a countershaft, a plurality of gear trains connecting the driving and driven shafts through the countershaft, one of said trains including a countershaft gear, a larger gear meshing therewith and carried by the driven shaft, overrunning clutch means connecting said larger gear and driven shaft, another of said trains including a countershaft gear, a smaller gear meshing therewith and carried by the driven shaft, and overrunning cluch means connecting said smaller gear and countershaft.]

25. An automatic transmission comprising a plurality of gear trains each including overrunning gears, a drive shaft, a driven shaft adapted to be connected to said gears and directly to said drive shaft, a plurality of clutches certain of which have one part permanently connected to said gears and one of which has one part adapted to be directly connected to the drive shaft thereby providing predetermined gear ratios, whereby the operation of a particular clutch sets up a transmission ratio different from those set up by the other clutches, means adapted to drive the clutches, hydraulic means for actuating one or more of the clutches [at the same time and in sequence], means for supplying fluid under pressure, speed responsive means for directing the supply of pressure [fluid] to said hydraulic means to actuate *certain of said clutches in sequence and in overlapping relation* [one or more of said clutches at the same time and in sequence], whereby a continuous transmission of power uninterrupted by speed variations is set up, and manually operated means adapted to restrain the speed responsive means against speed responsive actuation during a predetermined speed range, whereby a selected tranmission ratio may be maintained during said range.

26. An automatic transmission comprising a plurality of gear trains each including overrunning gears, a drive shaft, a driven shaft adapted to be connected to said gears and directly to said drive shaft, a plurality of clutches certain of which have one part permanently connected to said gears and one of which has one part adapted to be directly connected to the drive shaft thereby providing predetermined gear ratios, whereby the operation of a particular clutch sets up a transmission ratio different from those set up by the other clutches, means adapted to drive the clutches, hydraulic means for actuating one or more of the clutches [at the same time and in sequence], means for supplying fluid under pressure, speed responsive means for directing the supply of pressure fluid to said hydraulic means to actuate *certain of said clutches in sequence and in overlapping relation* [one or more of said clutches at the same time and in sequence], whereby a continuous transmission of power uninterrupted by speed variations is set up, and manually operated means for holding said speed responsive means in a fixed position during a predetermined speed range and *for* releasing said means for speed responsive actuation during other speed ranges.

27. An automatic transmission comprising a plurality of gear trains each including overrunning gears, a drive shaft, a driven shaft adapted to be connected to said gears and directly to said drive shaft, a plurality of clutches certain of which have one part permanently connected to said gears and one of which has one part adapted to be directly connected to the drive shaft thereby providing predetermined gear ratios, whereby the operation of a particular clutch sets up a transmission ratio different from those set up by the other clutches, means adapted to drive the clutches, hydraulic means for actuating one or more of the clutches [at the same time and in sequence], means for supplying fluid under pressure, a valve having speed responsive actuating means and acting to direct the supply of pressure fluid to said hydraulic means to actuate *certain of said clutches in sequence and in overlapping relation* [one or more of said clutches at the same time and in sequence], whereby a continuous transmission of power uninterrupted by speed variations is set up, and manually operated means adapted to restrain the valve against speed responsive actuation during a predetermined speed range, whereby a predetermined transmission ratio may be maintained during said range.

28. An automatic transmission comprising a plurality of gear trains each including overrunning gears, a drive shaft, a driven shaft adapted to be connected to said gears and directly to said drive shaft, a plurality of clutches certain of which have one part permanently connected to said gears and one of which has one part adapted to be directly connected to the drive shaft, thereby providing predetermined gear ratios, whereby the operation of a particular clutch sets up a transmission ratio different from those set up by the other clutches, means adapted to drive the clutches, hydraulic means for actuating one or more of the clutches [at the same time and in sequence], means for supplying fluid under pressure, a valve having speed responsive actuating means and acting to direct the supply of pressure fluid to said hydraulic means to actuate *certain of said clutches in sequence and in overlapping relation* [one or more of said clutches at the same time and in sequence], whereby a continuous transmission of power uninterrupted by speed variations is set up, and manually operated means for holding said valve in a fixed position during a predetermined speed range and releasing said valve for speed responsive actuation during other speed ranges.

[29. An automatic transmission comprising, a plurality of clutches, revolving transmission members individually connected to individual clutches, each clutch and its connected transmission member setting up a different gear ratio from those set up by the other clutches and their transmission members, means adapted to drive the clutches, hydraulic means for operating one or more of said clutches at the same time and in sequence, means controlling the actuation of said hydraulic means, a speed responsive device actuating said controlling means and thereby setting up sequent transmission ratios without fixed differentials, and manually operated means adapted to restrain the speed responsive means against speed responsive actuation during a predetermined speed range, whereby a selected transmission ratio may be maintained during said range.]

[30. An automatic transmission comprising, a plurality of clutches, revolving transmission members individually connected to individual clutches, each clutch and its connected transmission member setting up a different gear ratio from those set up by the other clutches and their transmission members, means adapted to drive the clutches, hydraulic means for operating one or more of said clutches at the same time and in sequence, means controlling the actuation of said hydraulic means, a speed responsive device actuating said controlling means and thereby setting up sequent transmission ratios without fixed differentials, and manually operated means for holding said speed responsive means in a fixed position during a predetermined speed range and releasing said means for speed responsive actuation during other speed ranges.]

[31. An automatic transmission comprising, a plurality of clutches, revolving transmission members individually connected to individual clutches, each clutch and its connected transmission member setting up a different gear ratio from those set up by the other clutches and their transmission members, means adapted to drive the clutches, hydraulic means for operating one or more of said clutches at the same time and in sequence, a valve controlling the actuation of said hydraulic means, a speed responsive device actuating said controlling means and thereby setting up sequent transmission ratios without fixed differentials, and manually operated means adapted to restrain the valve against speed responsive actuation during a predetermined speed range, whereby a predetermined transmission ratio may be maintained during said range.]

[32. An automatic transmission comprising, a plurality of clutches, revolving transmission members individually connected to individual clutches, each clutch and its connected transmission member setting up a different gear ratio from those set up by the other clutches and their transmission members, means adapted to drive the clutches, hydraulic means for operating one or more of said clutches at the same time and in sequence, a valve controlling the actuation of said hydraulic means, a speed responsive device actuating said controlling means and thereby setting up sequent transmission ratios without fixed differentials, and manually operated means for holding said valve in a fixed position during a predetermined speed range and releasing said valve for speed responsive actuation during other speed ranges.]

[33. An automatic transmission comprising, a plurality of clutches, transmitting members adapted to be connected with a part of each clutch, means adapted to drive said clutches, hydraulic means for actuating one or more of said clutches at the same time, a pressure fluid supply conductor, pressure fluid distributing conductors connected with said hydraulic means for supplying pressure fluid thereto, a movable valve controlling the passage of pressure fluid from the supply conductor to individual distributing conductors to actuate one or more of the clutches at the same time, a speed responsive governor connected with said valve and operating the same, and means adapted to hold said valve in an adjusted position to maintain a predetermined transmission ratio in opposition to speed responsive actuation by said governor.]

34. An automatic transmission comprising a plurality of gear trains each including overrunning gears, a drive shaft, a driven shaft adapted to be connected to said gears and directly to said drive shaft, a plurality of clutching means certain of which have one part permanently connected to said gears and one of which has one part adapted to be directly connected to the drive shaft thereby providing predetermined gear ratios, whereby the operation of a particular clutching means sets up a transmission ratio different from those set up by the other clutching means, means adapted to drive the clutching means, hydraulic means for actuating one or more of the clutching means [at the same time and in sequence], means for supplying fluid under pressure, speed responsive means for directing the supply of pressure fluid to said hydraulic means to actuate *certain of said clutches in sequence and in overlapping relation* [one or more of said clutching means at the same time and in sequence], whereby a continuous transmission of power uninterrupted by speed variations is set up, and manually operated means adapted to restrain the speed responsive means against speed responsive actuation during a predetermined speed range, whereby a selected transmission ratio may be maintained during said range.

*35. In a change speed gear transmission device, substantially coaxial driving and driven shafts, a countershaft parallel to both, a plurality of gear trains carried partly by the countershaft and partly by the driving and driven shafts for connecting said driving and driven shafts through trains of different ratios including, means connecting the said driving shaft and countershaft, a first gear set havng an intermediate speed gear carried by the countershaft and connected thereto through an overrunning clutch and a first driven gear on the said driven shaft meshing with the said intermediate speed gear, first friction clutch means for rendering the said first gear set effective and ineffective, a second gear set having a low speed gear carried by the countershaft and a second driven gear carried by the driven shaft and meshing with the said low speed gear to provide a high torque drive, positively engageable and disengageable means for rendering said second gear set effective and ineffective, said second gear set and said means for rendering the said second gear set effective and ineffective providing a driving connection independent of the previously mentioned first gear set and first friction clutch means, and second friction clutch means providing a driving connection between the said driving and driven shafts.*

*36. In a change speed gear transmission, a driving shaft, a driven shaft, a plurality of gear trains for connecting said shafts in variant relative driving speed relation, fluid pressure responsive valve means including hydraulically actuated friction clutches for selectively rendering said trains effective or ineffective at will, governor means including a centrifugally actuated means responsive to the speed of the driven shaft for automatically supplying fluid pressure to said valve means to effect operation of the said hydraulically actuated friction clutches, means movable to establish neutral and reverse drive positions, and means responsive to such establishment of one of said drive positions for rendering said governor means ineffective.*

*37. In a change speed gear transmission, a driving shaft, a driven shaft, a plurality of gear trains for connecting said shafts in variant relative driving speed relation and including an element shiftable to establish a forward low speed drive and also shiftable to a neutral position, personally operable means for shifting said element, fluid pressure responsive valve means including hydraulically actuated friction clutches for selectively rendering said trains effective or ineffective at will, governor means including a centrifugally actuated means responsive to the speed of the driven shaft for automatically supplying fluid pressure to said valve means to effect operation of the said hydraulically actuated friction clutches, and means for rendering said governor*

*means ineffective when said shiftable element is in one position.*

*38. In a change speed gear transmission, a driving shaft, a driven shaft, a plurality of gear trains for connecting said shafts in variant relative driving speed relation and including an element shiftable to establish a forward low speed drive and also shiftable to a neutral position, personally operable means for shifting said element, fluid pressure responsive valve means including hydraulically actuated friction clutches for selectively rendering said trains effective or ineffective at will, governor means including a centrifugally actuated means responsive to the speed of the driven shaft for automatically supplying fluid pressure, and means for rendering said governor means ineffective when said shiftable element is in low speed position.*

*39. In a change speed gear transmission, a driving shaft, a driven shaft, a plurality of gear trains for connecting said shafts in variant relative driving speed relation, fluid pressure responsive valve means including hydraulically actuated friction clutches for selectively rendering said trains effective or ineffective at will, governor means including a centrifugally actuated means responsive to the speed of the driven shaft for automatically supplying fluid pressure to said valve means to effect operation of the said hydraulically actuated friction clutches, manually operable means for preventing operation of the said valve means by said fluid pressure and for establishing neutral and reverse drive positions, and means responsive to such establishment of one of said drive positions for rendering said governor means ineffective.*

*40. In a change speed gear transmission, a driving shaft, a driven shaft, a plurality of gear trains for connecting said shafts in variant driving speed relation, fluid pressure connections, valve means operable from the said connections for selectively rendering said gear trains effective or ineffective at will, governor means including a centrifugally operated element responsive to the speed of the driven shaft for automatically controlling said valve means, means comprising a manually operable member movable to different positions for establishing neutral and reverse drive conditions, and means controlled by said member in its movement to said positions for rendering said governor means ineffective to control said valve means.*

*41. In a change speed gear transmission, a driving shaft, a driven shaft, a plurality of gear trains for connecting said shafts in variant driving speed relation, fluid pressure connections, valve means operable from the said connections for selectively rendering said gear trains effective or ineffective at will, governor means including a centrifugally operated element responsive to the speed of the driven shaft for automatically controlling said valve means, means comprising a manually operable member movable to different positions for establishing neutral and reverse drive conditions, and means for disrupting a flow of fluid pressure to said valve means controlled by said member in its movement to said positions.*

*42. In a change speed gear transmission, a driving shaft, a driven shaft, a plurality of gear trains for connecting said shafts in variant driving speed relation, pumping means providing a source of fluid pressure, passage means for conducting fluid pressure from said pumping means, valve means movable with respect to said passage means for selectively rendering said gear trains effective or ineffective at will, centrifugally operated governor means responsive to the speed of the driven shaft for automatically controlling said valve means, means comprising a manually operable member movable to different positions for establishing neutral and reverse drive conditions and means controlled by said member in its movement to one of said positions for rendering said pumping means ineffective to control said valve means.*

*43. In a change speed gear transmission, a driving shaft, a driven shaft, a plurality of gear trains for connecting said shafts in variant driving speed relation, pumping means providing a source of fluid pressure, passage means for conducting fluid pressure from said pumping means, valve means movable with respect to said passage means for selectively rendering said gear trains effective or ineffective at will, centrifugally operated governor means responsive to the speed of the driven shaft for automatically controlling said valve means, means comprising a manually operable member movable to different positions for establishing neutral and reverse drive conditions and for concomitantly preventing flow of fluid pressure to said valve means in at least one of said drive conditions.*

*44. In a change speed gear, i. e., a driving shaft, a driven shaft, a plurality of gear trains for connecting said shaft in variant driving speed relation, pumping means providing a source of fluid pressure, means comprising fluid pressure actuated friction gripping devices for selectively rendering said trains effective or ineffective at will, passage means for conducting a fluid pressure from said pumping means, valve means movable with respect to said passage means for controlling flow of fluid pressure to said friction gripping device to selectively render said gear trains effective or ineffective at will, centrifugally operating governor means responsive to the speed of the driven shaft for automatically controlling said valve means, means comprising a manually operable member movable to different positions for establishing neutral and reverse drive conditions, and means for rendering said governor means ineffective to control said valve means controlled by said member in its movement to said positions.*

*45. In a change speed gear, i. e., a driving shaft, a driven shaft, a plurality of gear trains for connecting said shafts in variant driving speed relation, pumping means providing a source of fluid pressure, means comprising fluid pressure actuated friction gripping devices for selectively rendering said trains effective or ineffective at will, passage means for conducting a fluid pressure from said pumping means, valve means movable with respect to said passage means for controlling flow of fluid pressure to said friction gripping device to selectively render said gear trains effective or ineffective at will, centrifugally operating governor means responsive to the speed of the driven shaft for automatically controlling said valve means, means comprising a manually operable member movable to different positions for establishing neutral and reverse drive conditions and means controlled by said member in its movement to said positions for controlling flow of fluid pressure to said valve means.*

ROBERT B. ASPINWALL.

(References on following page)

REFERENCES CITED

The following references are of record in the file of this patent or the original patent:

UNITED STATES PATENTS

| Number | Name | Date |
|---|---|---|
| Re. 20,186 | Hoy | Dec. 1, 1936 |
| Re. 21,844 | Vetter | June 24, 1941 |
| 799,088 | Prentice | Sept. 12, 1905 |
| 857,393 | Hagman | June 18, 1907 |
| 907,711 | Anthony | Dec. 29, 1908 |
| 963,092 | Sundh | July 5, 1910 |
| 1,138,098 | Formaca | May 4, 1915 |
| 1,195,206 | Goodspeed | Aug. 22, 1916 |
| 1,187,493 | Brimson | June 20, 1916 |
| 1,199,640 | Vincent | Sept. 26, 1916 |
| 1,277,299 | Duncan | Aug. 27, 1918 |
| 1,351,597 | Wingfield | Aug. 31, 1920 |
| 1,412,688 | Layton | Apr. 11, 1922 |
| 1,449,819 | Higinbothom | Mar. 27, 1923 |
| 1,512,675 | Chryst | Oct. 21, 1924 |
| 1,523,648 | Jackson | Jan. 20, 1925 |
| 1,535,790 | Richardson | Apr. 28, 1925 |
| 1,577,044 | Turney | Mar. 16, 1926 |
| 1,579,540 | Jackson | Apr. 6, 1926 |
| 1,609,782 | Small et al. | Dec. 7, 1926 |
| 1,661,613 | Jackson | Mar. 6, 1928 |
| 1,701,395 | Short | Feb. 5, 1929 |
| 1,708,215 | Chryst | Apr. 9, 1929 |
| 1,724,983 | Weiss | Aug. 20, 1929 |
| 1,725,151 | Lock | Aug. 20, 1929 |
| 1,731,076 | Maurer | Oct. 8,1929 |
| 1,818,910 | Sanine | Aug. 11, 1931 |
| 1,822,716 | Vail | Sept. 8, 1931 |
| 1,830,395 | Hanson | Nov. 3, 1931 |
| 1,838,096 | Fleischel | Dec. 29, 1931 |
| 1,843,523 | Starkey et al. | Feb. 2, 1932 |
| 1,886,003 | Garrison | Nov. 1, 1932 |

| Number | Name | Date |
|---|---|---|
| 1,895,822 | Ruechart et al. | Jan. 31, 1933 |
| 1,901,283 | Burtnett | Mar. 14, 1933 |
| 1,911,599 | Bloxsom | May 30, 1933 |
| 1,917,501 | Cotterman | July 11, 1933 |
| 1,920,579 | Mock | Aug. 1, 1933 |
| 1,942,197 | Blackstock | Jan. 2, 1934 |
| 1,942,669 | Smith | Jan. 9, 1934 |
| 1,944,069 | Connors | Jan. 16, 1934 |
| 1,950,914 | Blakely | Mar. 13, 1934 |
| 1,958,427 | Hainsworth | May 15, 1934 |
| 1,969,560 | Keller | Aug. 7, 1934 |
| 1,969,561 | Keller | Aug. 7, 1934 |
| 1,977,007 | Nardone | Oct. 16, 1934 |
| 1,979,077 | Pilaar | Oct. 30, 1934 |
| 1,979,488 | Perez | Nov. 6, 1934 |
| 1,980,505 | Snow | Nov. 13, 1934 |
| 1,984,556 | Vetter | Dec. 18, 1934 |
| 1,990,690 | Hantschel et al. | Feb. 12, 1935 |
| 1,993,544 | Fleischel | Mar. 5, 1935 |
| 2,003,212 | Millrian et al. | May 28, 1935 |
| 2,008,231 | Vincent | July 16, 1935 |
| 2,019,146 | Livermore | Oct. 29, 1935 |
| 2,028,152 | Gray | Jan. 21, 1936 |
| 2,049,449 | Forichon | Sept. 28, 1937 |
| 2,080,067 | Strcatur | May 11, 1937 |
| 2,120,104 | Livermore | June 7, 1938 |
| 2,233,720 | Velo | Mar. 4, 1941 |
| 2,465,334 | Wheaton | Mar. 22, 1949 |

FOREIGN PATENTS

| Number | Country | Date |
|---|---|---|
| 337,033 | Great Britain | Oct. 27, 1930 |
| 585,516 | France | Dec. 10, 1924 |
| 748,204 | France | Apr. 10, 1933 |

OTHER REFERENCES

Tyler, Vacuum Operated Clutches, pages 424–426, inc., of Automotive Industries, April 8, 1933.